Aug. 26, 1969     D. O. HAMMOND     3,463,144
SURGICAL RETRACTOR
Filed June 13, 1966
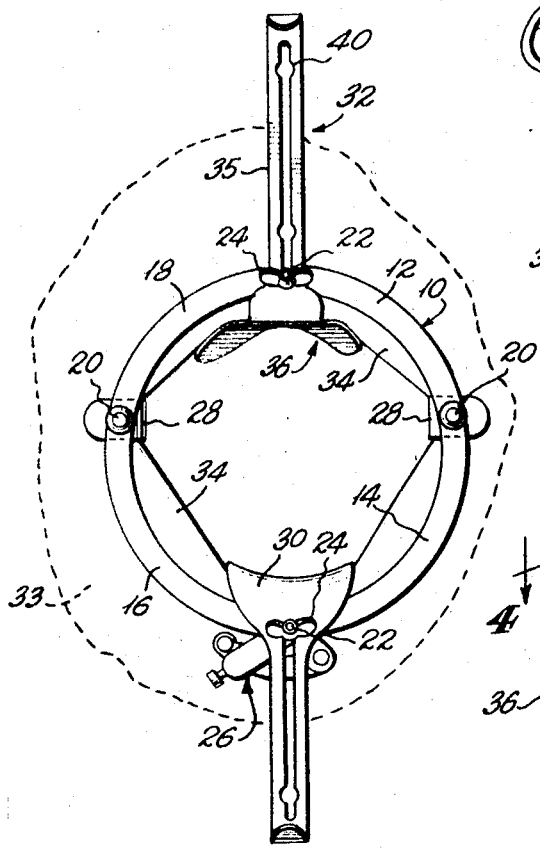
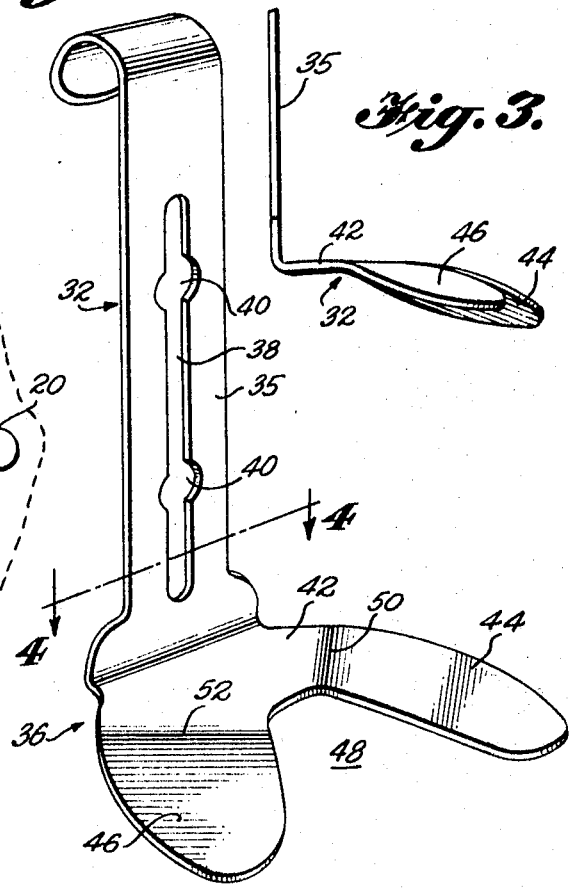
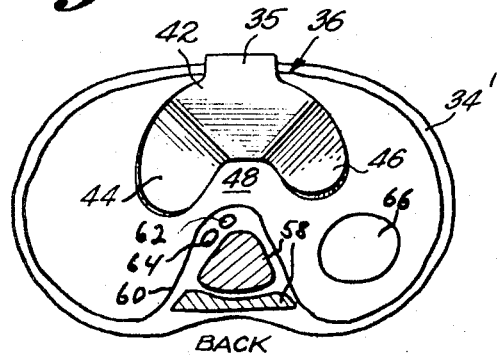
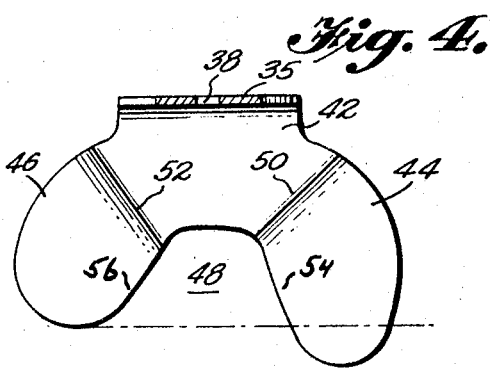
INVENTOR.
Daniel O. Hammond
BY Joshf. Oshuff
ATTORNEYS

United States Patent Office 3,463,144
Patented Aug. 26, 1969

3,463,144
SURGICAL RETRACTOR
Daniel O. Hammond, 5901 N. Bayshore Drive,
Miami, Fla. 33137
Filed June 13, 1966, Ser. No. 557,150
Int. Cl. A61b *1/32, 1/00*
U.S. Cl. 128—20                                     4 Claims

ABSTRACT OF THE DISCLOSURE

An upper abdominal retractor comprising a mounting arm adjustably mountable in a retractor frame and a retractor blade having a substantially flat central section depending from the mounting arm at an angle of about 90° and two substantially flat wings extending laterally from said central section, the ends of said wings being free and spaced apart to define a notch between said wings.

---

The present invention relates to a retractor and more particularly to a self-retaining upper abdominal retractor.

In recent years the use of self-retaining retractors have become relatively commonplace in abdominal surgery, partly because they provide better exposure of the abdominal cavity and partly because during many operations the surgeon does not have available sufficient assistants. The self-retaining retractors now in use are deficient because they do not provide completely satisfactory retractors for the upper abdominal area.

At present the upper abdominal retractors which have been used are not adequate to retract both the abdominal wall and the viscera. The spinal column extends along the midline of the abdominal cavity, and the spinal column forms a midline promontory which projects into the operative field. The prior art retractors have been simple midline retractors, that is, retractors which are positioned over the midline promontory, and only retract the abdominal wall. A flat upper abdominal retractor has been used, but this is inadequate since it rests on the anterior aspect of the vertebral midline promontory. Because of these deficiencies, very few surgeons use an upper abdominal retractor, even though the retractor frame includes a mounting post for mounting such a retractor.

The present invention particularly relates to an upper abdominal retractor which can be used with the retractor frame of United States Patent No. 1,919,120 to O'Connor et al., in lieu of the upper abdominal retractor shown therein. The self-retaining retractor shown in said patent is frequently called the O'Sullivan-O'Connor retractor.

As will be appreciated from the description of the present invention set forth hereinafter, this invention relates to a retractor which is a winged retractor having a notch between the wings to provide a space for receiving the vertebral bodies, with the wings coming down on either side of the vertebral column and very effectively holding up the abdominal contents on either side of the column.

Therefore, according to one aspect of the present invention there is provided an upper abdominal retractor comprising a mounting arm for adjustably mounting the retractor in a retractor frame and a substantially flat retractor blade depending transversely from one end of said arm, said retractor blade comprising two lateral wings, the ends of the wings being free and spaced apart to define a notch between said wings. According to the preferred aspect of the invention one of said wings is shorter than the other.

These and other aspects of the present invention will be readily apparent from the following description with reference to the accompanying drawings, wherein:

FIG. 1 shows the retractor of the present invention mounted on the retractor frame in position in the abdomen during surgery;

FIG. 2 is a perspective view of the retractor;

FIG. 3 is a side elevation of the retractor;

FIG. 4 is across section of the retractor taken along the line 4—4 of FIGURE 2; and FIG. 5 is a diagrammatic cross-sectional sketch of a body showing the position of the retractor in the abdominal cavity, particularly with reference to the midline promontory.

Referring to FIG. 1, the retractor frame 10 comprises four articulated, pivotally connected curved arms 12, 14, 16 and 18, arms 18 and 16 and arms 12 and 14 being pivotally connected by rivets 20. Arm 12 is pivotally connected to arm 18, and arm 14 is pivotally connected to arm 16, these arms being pivotally connected by bolts 22 carrying wing nuts 24. Also attached by rivets 20 are hook-like lateral retractors 28. Lower retractor 30 and upper retractor 32 are adjustably mounted on the frame by wing nuts 24. At the lower end of the retractor there is a locking device indicated generally by the numeral 26.

The retractor frame as above described, including the locking device 26, are more completely described in U.S. Patent 1,919,120, and the disclosure of said patent is hereby incorporated by reference. It is not considered necessary to go into further detail of the O'Sullivan-O'Connor retractor, since the details thereof are well known to the public, except to state that the upper retractor 32 shown in FIGURE 1 of this application is the retractor of the present invention, and is not that shown in U.S. Patent No. 1,919,120. However, the retractor of the invention is mounted on the retractor frame in the same manner as is the upper retractor shown in FIGURE 6 of said patent.

In FIG. 1 the frame with the retractor thereon is shown diagrammatically mounted in the open abdominal cavity of a patient undergoing surgery, with the outer surface of the abdominal wall being shown at 33, and the retracted abdominal wall being shown at 34. In FIG. 1 the upper retractor 32 is positioned in the opening of the abdominal cavity nearest the head of the patient, and the lower retractor 30 is at the end of the abdominal cavity closest the feet of the patient.

The retractor 32 which is the retractor of the present invention comprises a generally flat mounting arm 35 and a substantially flat retractor blade 36 depending transversely from one end of said mounting arm. The mounting arm has a central longitudinal slot intersecting circular openings 40, so that when said retractor is mounted on the retractor frame the wing nut 24 can pass through one of said openings 40, and the retractor blade can be slid along bolt 22 to the desired position, at which time the wing nut is tightened to hold the retractor in position.

The retractor blade comprises a central section 42 which depends transversely at approximately 90 degrees from the mounting arm 35, and from said central section there extend laterally therefrom wings 44 and 46, the ends of the wings being free and spaced apart from each other to define a notch or recess 48 between said wings. In the illustrated and preferred embodiment the wings 44 to 46 are bent forwardly, at a relatively small angle, out of the plane of central section 42 along the lines 50 and 52. In the illustrated embodiment these wings are bent out of the plane of the central section at an angle of about 15 degrees, although the angle may vary between about five and 25 degrees. It will be appreciated that although the wings are bent out of the plane of the central section, the blade is still substantially flat, at least in comparison with prior art blades, such as shown in U.S. Patent No. 1,919,-

120, which are hook-shaped or J-shaped. In general, it may be said that broadly the shape of the retractor of the present invention is L-shaped, with the wings defining the short arm of the L. Stated differently, the wings preferably do not bend inwardly. That is, they are not reversedly curved or bent toward the mounting arm to define a hook. Angling the wings forwardly renders it easier to insert the blade in the abdominal wound. This forward angling of the blade facilitates insertion since the abdominal wall is angulated in that fashion without retraction.

In the illustrated embodiment, the wings 44 and 46 and their longitudinal axes, angle laterally away from each other from their juncture with the central section 42 in the direction of their free ends, so that the space 48 is narrower adjacent the central section 42 than it is adjacent the free ends of the wings, the space 48 being somewhat dome-shaped or frusto-conical. This shape is preferred because it permits the retractor blade to span the spinal promontory.

The wings, more accurately, the inner edges 54 and 56 of the wings form an angle to provide sufficient clearance about the spinal promontory. In the illustrated embodiment, the inner edges 54 and 56 are from an angle of about 60 degrees, although this angle can be varied, depending upon the shape of the spinal promontory. Generally, the angle can be between about 50 and 80 degrees. In the illustrated embodiment, the notch 48 is about the size of a wing.

As can be seen most clearly in FIGS. 4 and 5, the wings are asymmetrical with the wing 44 being longer than wing 46. The purpose of this difference in size is evident from FIG. 5 which shows diagrammatically the retractor blade positioned in the abdominal cavity. FIGURE 5 is a diagrammatic cross-sectional sketch of the human body looking toward the head end, with the back being on the bottom and the anterior abdominal surface being on top of the figure, the abdominal wall being shown at 34'. The left-hand side of FIG. 5 corresponds to the right-hand side of the body, and the right-hand side of the figure corresponds to the left-hand side of the body. In the bottom central portion of the figure there is shown the spinal promontory which comprises the spinal column 58 covered by the lining of the abdominal cavity 60 in which are located the two major blood vessels of the abdominal cavity, namely, the aorta 62 and the vena cava 64. These blood vessels are situated in the anterior surface of the promontory.

It will be appreciated that the retractor blade can be positioned over the promontory so that the promontory is received in notch or recess 48. The descending colon 66 is on the left side of the abdomen, and if wings 44 and 46 were of the same length, wing 46 would compress the colon. It is for this reason that wing 46 is shorter than wing 44. It is readily apparent that by providing a retractor having the spaced apart wings as described above, the retractor can be positioned over the spinal promontory, and the wings can extend on either side of the promontory into what are popularly known as the lateral gutters.

It will be appreciated from FIG. 5 that when the retractor of the present invention is in use it will not apply pressure to the spinal promontory, particularly to the blood vessels or to the descending colon. In the diagrammatic representation shown in FIG. 5 there is an appreciable space between the retractor and the promontory and the descending colon, but in actual practice these may be much closer.

The retractor frame with the retractor thereon may be inserted into the abdominal cavity through the incision in the manner conventional with the O'Sullivan-O'Connor retractor, and this is described in U.S. Patent No. 1,919,120.

I claim:

1. An upper abdominal retractor comprising a unitary mounting arm and retractor blade, means on said mounting arm for adjustably mounting the retractor in a retractor frame, one end of said arm being substantially flat, said retractor blade comprising a substantially flat central section and two substantially flat wings extending laterally from said central section, the ends of said wings being free and spaced apart to define a notch between said wings, said central section depending transversely at an angle of about 90° from said one end of said arm, said wings being inclined forwardly, away from said arm, at a small angle out of the plane of said central section, the planes of the wings being at an angle to each other, and one of said wings being shorter than the other.

2. An upper abdominal retractor according to claim 1, wherein no portion of said retractor blade extends rearwardly beyond said one end of said mounting arm.

3. An upper abdominal retractor according to claim 2, wherein said notch is approximately the same size as said wings.

4. An upper abdominal retractor according to claim 1, in combination with and mounted in a self-retaining retractor frame.

References Cited

UNITED STATES PATENTS

| | | | |
|---|---|---|---|
| 278,520 | 5/1883 | Doyle | 128—20 |
| 1,400,616 | 12/1921 | McCrory | 128—20 |
| 1,474,497 | 11/1923 | Stolper | 128—20 |
| 1,919,120 | 7/1933 | O'Connor et al. | 128—20 |
| 2,863,444 | 12/1958 | Winsten | 128—20 |
| 3,070,088 | 12/1962 | Brahos | 128—20 |

OTHER REFERENCES

Fracture Equipment by Zimmer, 1954, (p. 170, No. 249, relied on), Zimmer Mfg. Co. catalogue.

Illustrations of Surgical Instruments, 17th edition, 1912–1913 (p. 5133, No. E/8275, relied on), Kny-Sheerer Co. catalogue.

RICHARD A. GAUDET, Primary Examiner

KYLE L. HOWELL, Assistant Examiner